UNITED STATES PATENT OFFICE.

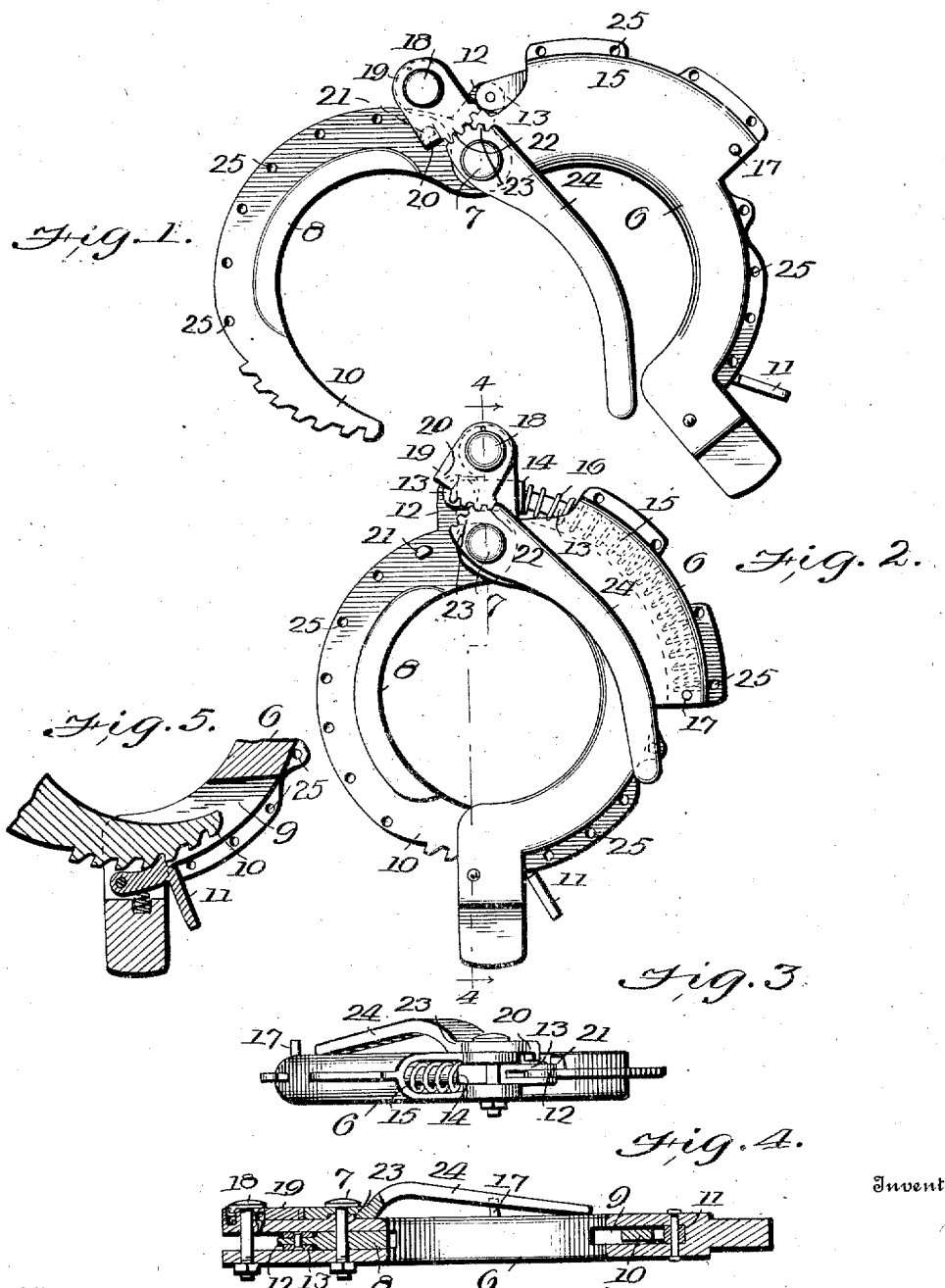

GEORGE SNEARLY, OF DETROIT, MICHIGAN.

SHACKLE.

No. 859,131.　　　Specification of Letters Patent.　　　Patented July 2, 1907.

Application filed March 21, 1907. Serial No. 363,679.

*To all whom it may concern:*

Be it known that I, GEORGE SNEARLY, a citizen of the United States, residing at Detroit, in the county of Wayne and State of Michigan, have invented certain new and useful Improvements in Shackles, of which the following is a specification.

This invention is a catching and holding tool designed for use in connection with a horseshoeing rack or stock, for the purpose of holding the hoof of the horse in proper and convenient position to be shod.

The object of the invention is to provide an improved device which can be quickly and easily applied to the hoof and which will automatically lock itself upon the leg of the horse when so applied. The invention may be used in connection with almost any of the known horseshoeing stocks or racks in which a horse is confined while being shod.

The invention is illustrated in the accompanying drawings, in which Figure 1 is a top plan view of the device in unlocked or set position. Fig. 2 is a similar view in locked position. Fig. 3 is an edge view. Fig. 4 is a section on the line 4—4 of Fig. 2. Fig. 5 is a detail in section showing the locking pawl.
Referring specifically to the drawings, 6 indicates a substantially semi-circular casing or member to which is pivoted, by a bolt 7, a co-operating substantially semi-circular part or member 8, and the two when closed form a cuff or ring of suitable size and shape to extend around the pastern and be locked thereon. The free end of the member 6 is recessed as indicated at 9 to receive a rack piece 10 projecting from the end of, or forming a continuation of, the member 8. And in the recess 9 is a spring pawl 11 adapted to engage the rack and lock the parts when closed.

At the knuckle or pivoted end the member 8 has a projection 12 to which is pivotally connected a curved rod 13, which has a shoulder seen at 14. This curved rod extends into a hollow 15 formed in the body of the member 6, and said rod has a coiled spring 16 around the same, in compression between the shoulder 14 and a pin 17 at the far end of the hollow 15.

Pivoted by a bolt 18, to lugs projecting from the member 6, is a latch piece 19 having a depending finger 20 arranged to engage behind a lug 21 projecting upwardly from the member 8. The latch piece also has a segment gear 22 which meshes with a segment gear 23 on a trigger 24 which is pivoted by the bolt 7 and which extends out across or beside the cuff or ring formed by the two members 6 and 8. The members 6 and 8 have peripheral flanges provided with holes 25 by which cords may be attached to pull or hold the horse's hoof in proper position.

In use, the device is set by pulling open the members 6 and 8, thereby compressing the spring 16, and then engaging the finger 20 of the latch around behind the lug 21, as shown in Fig. 1. This is done by shifting the trigger, after the members are pulled open far enough. In this position, the gear connection between the latch piece and the trigger causes the said trigger to extend across the cuff or open space within the tool. The device is then grasped in the hand, or in a pair of tongs, and applied to the leg of the horse at the pastern, which strikes the trigger, causing the same to turn and to turn the latch piece 19 so that its finger 20 is released from the lug 21. The force of the spring 16 then immediately throws the member 8 around, snapping the tool upon the pastern. As it closes the notched extension 10 swings into the recess 9 and the notches are engaged by the dotent or pawl 11, thereby locking the device upon the foot. The hoof may then be lifted or pulled up by the cords and then held in proper position while being shod. Release is effected by springing back the pawl 11 and pulling open the members.

I claim:

1. A device of the kind described, comprising two curved members pivoted together at one end, and having a catch at the other end adapted to hold the same closed, one of said members having a hollow portion and the other having a projection and a rod pivoted to said projection and extending into the hollow portion, a spring coiled around said rod in compression between the members and tending to close the same, and a latch engageable between the members, and adapted to hold same open when engaged.

2. A device of the kind described, comprising two curved members pivoted together at one end, and having a catch at the other end adapted to hold the same closed, a spring between the members, tending to close the same, a latch piece pivoted to one of the members and having a projection adapted to engage the other, and also having a segment gear, and a trigger pivoted to one of the members and extending across the same and having a segment gear meshing with said first named segment gear, and adapted to automatically release the latch piece when the device is applied to an animal's leg.

In testimony whereof I affix my signature, in presence of two witnesses.

GEORGE SNEARLY.

Witnesses:
　CORA E. HEMPEL,
　ELIZABETH J. PRICE.